UNITED STATES PATENT OFFICE.

EDWARD LYONS, OF DETROIT, MICHIGAN, ASSIGNOR TO PARKE, DAVIS & COMPANY, OF DETROIT, MICHIGAN, A CORPORATION OF MICHIGAN.

ORGANIC MERCURY COMPOUND.

No Drawing.   Application filed November 12, 1923.  Serial No. 674,387.

My invention relates to the preparation of a new series of compounds derived from mercury salts and certain organic compounds containing one or more carbonyl (CO) or sulfonyl ($SO_2$) groups. These new compounds are of especial utility for their germicidal, antiseptic and antisyphilitic properties and are usually obtained as white or slightly yellow bodies which do not give the ionic test for mercury with an alkali, i. e. they do not precipitate mercuric oxide when treated with sodium hydroxide.

As an example of one of the new compounds, I shall first describe the preparation of a mercury derivative of diethyl-sulfone-dimethyl methane (sulfonal), which contains 2 sulfonyl groups, as will be seen from the following formula:

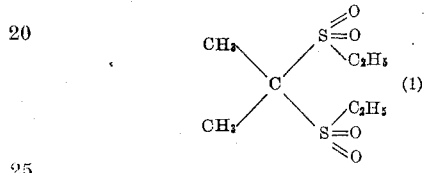

According to my new process, I have found that it is possible to obtain from this compound several different mercury derivatives according to the number of sulfonyl groups affected but the one which is most readily obtained pure contains four atoms of mercury to one of sulfonal and probably has the following structural formula:

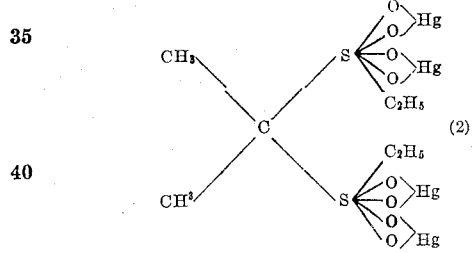

There are four atoms of mercury which have been respectively linked to the four atoms of oxygen which are present in the two sulfonyl groups and it seems, therefore, that a characteristic feature of the mercurial compounds discovered by me is that they contain the mercury grouped according to the following relation:

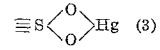

In the derivatives of sulfonal containing less than four atoms of mercury, it is probable that fewer of the oxygen atoms of the sulfonyl groups are affected.

In the preparation of the sulfonal derivative containing four atoms of mercury the procedure is as follows: 2.28 grams sulfonal are suspended in hot water, to which is added 3.2 grams sodium hydroxide (or an equivalent amount of another base). This is followed, in portions, by an aqueous solution containing 12.72 grams of mercury acetate. Each portion of the acetate is allowed to react before another is added and the process is continued until mercury ions are no longer present when the precipitate is washed thoroughly and dried. For its purification, it is dissolved in glacial acetic acid forming a saturated solution from which a water soluble product is obtained containing as many as three or four molecules of acetic acid. This product is washed with small amounts of water, then with alcohol and ether, after which it is re-dissolved in water and upon the addition of an alkali a pure white precipitate is obtained represented by the following formula:

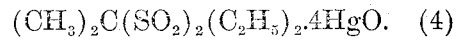

The analysis of this product shows a percentage of mercury equal to 73.10%, while the theoretical amount of mercury present according to formula (4) would be 73.3%.

By carrying out the above process in substantially the same manner with trional (diethyl-sulfone ethyl methyl methane) a similar compound has been readily obtained and proved to be the monomercury derivative represented by the following formula:

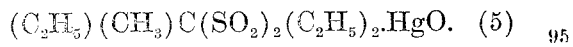

Analysis of this substance gave 44.34% mercury, whereas the theory for this formula is 43.54% mercury. It has also been found that other analogous compounds can be formed starting with other organic bodies containing the sulfonyl group, for example benzoic sulfinid (saccharin) may be used and I have prepared a monomercury derivative of this substance according to the following procedure: Twenty grams saccharin (1.7 grams excess) are dissolved in 100 cc. water with the aid of 25 cc. of a solution containing 14 grams caustic e. g. sodium hydroxide. This solution is heated and a solution of 31.8 grams mercuric acetate in 50 cc. water is added thereto drop by drop. At first a yellow precipitate may be formed but this soon dissolves and when all the acetate is added a colorless, slightly alkaline solution is obtained. This is filtered from a slight amount of impurity and poured into methyl or ethyl alcohol, thereby precipitating a white water soluble compound corresponding to the following formula:

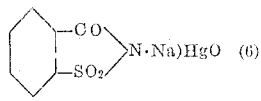

Two tests for the mercury content of this compound gave 47.4% and 47.6% mercury, while the theory for the above formula is 47.51%.

For the preparation of the di and tri-mercury derivatives of benzoic sulfinid, it is preferable to use the monoderivative as the starting point, rather than carry the reaction out in one step, because in this way, it is possible to obtain the product less contaminated. The procedure is similar to that outlined above for the monomercury derivative except that in this case only two equivalents of sodium hydroxide are used. The compounds obtained are monosodium salts having two or three mercury atoms according to the amount which is desired. The di-mercury compound is represented by the following formula:

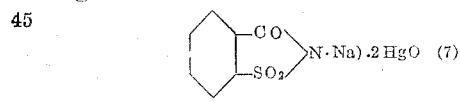

and has been found to contain 63.1% and 63.17% of mercury, while the theory according to the formula is 62.8%.

The tri-mercury derivative is obtained in the same manner as above by using the proper amount of mercury salt but it is separated from the di-mercury compound with some difficulty. The product however may be obtained reasonably pure, the analysis showing a mercury content of 70.55%, whereas the theoretical percentage would be 70.34% according to the following formula:

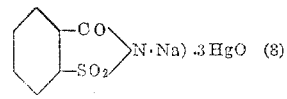

In the benzoic sulfinid compounds above described it will be noted that there is only one sulfonyl group and, therefore, it would be expected that only two atoms of mercury could be introduced into the molecule but it will be noted that the compound also contains a carbonyl group and I have found also that mercury derivatives may be obtained which appear to have the mercury linked with the carbonyl group in a manner corresponding to the linkage with the sulfonyl group. Therefore, in the tri-mercury derivative of benzoic sulfinid, the structural formula is probably as follows:

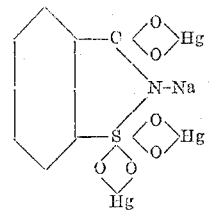

In the preparation of these new mercurial compounds I do not wish to limit myself to the use of mercuric acetate alone for it is obvious that other soluble salts of mercury might be used equally as well. Freshly prepared mercuric oxide may also be used for carrying out the reaction, although it is preferable to use a soluble salt, which in the presence of an alkali forms the nascent oxide of mercury which combines with the organic compound with which it is desired that it should react.

From the above description, it will be seen that I have discovered a new series of compounds, which may be considered as the mercurial derivatives of organic substances containing the carbonyl or the sulfonyl group and that these substances have the mercury so combined that they fail to give the ionic test for mercury with sodium hydroxide, thus differentiating the compounds from a large number of organic mercury compounds previously known to science.

What I claim as my invention is:—

1. A new organic mercury compound containing the following group:

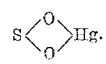

2. The new mercury compounds obtained by the inter-action of mercuric oxide with organic compounds containing the sulfonyl group.

3. A new organic mercury compound which may be regarded as a derivative of an organic compound containing the sulfonyl group and mercury, the latter element being so combined that the compound fails to give the ionic test for mercury with caustics.

4. A new organic mercury compound which may be regarded as a derivative of an organic compound containing the sulfonyl group and mercuric oxide, said compound not giving the ionic test for mercury with caustics and being represented by a structural formula containing the following group:

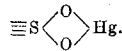

5. A new organic mercury compound which may be regarded as a derivative of an organic compound containing the sulfonyl group and mercuric oxide, said compound not giving the ionic test for mercury with caustics and being represented by a structural formula containing the following group:

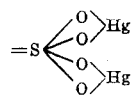

6. A new organic mercury compound which may be regarded as a derivative of sulfonal and a salt of mercury, said compound being a white crystalline body not capable of giving the ionic test for mercury with caustics.

7. A new organic mercury compound represented by the following structural formula:

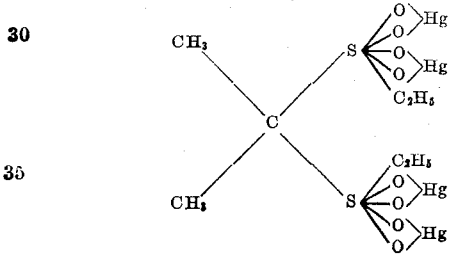

8. The process for obtaining organic mercury compounds, which consists in adding mercuric oxide to an organic compound containing the sulfonyl group.

9. The process of obtaining organic mercury compounds, which consists in forming a mixture of an organic compound containing the sulfonyl group and water, and adding thereto a salt of mercury in the presence of an alkali.

10. A new organic mercury compound which is the reaction product of mercuric oxide with an organic compond having the structure

where X and X' represent carbonyl or sulfonyl groups, said new mercury compound containing the mercury directly linked to the oxygen of the carbonyl or sulfonyl groups according to the formula

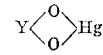

where Y represents carbon or sulphur and R represents an organic radical.

11. A new organic mercury compound which is the reaction product of mercuric oxide with an organic compound having the structure

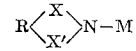

where X and X' represent carbonyl or sulfonyl groups and M represents a metal, said new mercury compound containing the mercury directly linked to the oxygen of the carbonyl or sulfonyl groups according to the formula

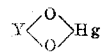

where Y represents carbon or sulphur and R represents an organic radical.

12. A new organic mercury compound represented by the following structural formula

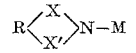

wherein X represents CO, SO$_2$,

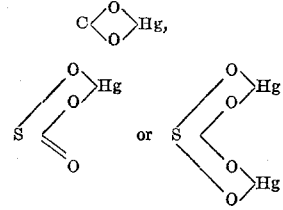

and X' represents

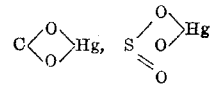

or

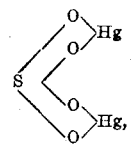

M represents a metal and R represents an organic radical.

In testimony whereof I affix my signature.

EDWARD LYONS.